United States Patent [19]
Carrigan

[11] 3,889,542
[45] June 17, 1975

[54] WHEEL MOUNTING APPARATUS
[75] Inventor: Tracy Carrigan, Lansing, Mich.
[73] Assignee: FMC Corporation, San Jose, Calif.
[22] Filed: Nov. 9, 1973
[21] Appl. No.: 414,474

[52] U.S. Cl. .................. 73/460; 73/484; 73/487
[51] Int. Cl. .................................. G01m 1/02
[58] Field of Search ............ 73/487, 459, 460, 480, 73/484; 285/166; 64/23.6

[56] References Cited
UNITED STATES PATENTS
3,236,105   2/1966   Hamer ............................. 73/487
3,785,210   1/1974   Muller ............................. 73/459

FOREIGN PATENTS OR APPLICATIONS
1,134,043  11/1956   France ............................ 73/487

*Primary Examiner*—James J. Gill
*Attorney, Agent, or Firm*—A. J. Moore; C. E. Tripp

[57] ABSTRACT

An apparatus for mounting a wheel and tire assembly on the drive shaft or spindle of a wheel balancer or the like in driven engagement with and concentric to the axis of the shaft. The apparatus includes a tubular adapter for receiving a double faced, stepped cone wheel centering device with a plurality of pairs of slots extending from each side past the midpoint of the device to define a plurality of evenly spaced resilient fingers on each face of the stepped cone, which fingers are bent radially outward of the adjacent portion of the cone to more effectively center the wheel by engaging the machined center hole of the wheel. The wheel is centered on and is secured to the tubular flanged adapter with the aid of the stepped cone centering device, a protective collar and a wing nut. The apparatus also includes in its combination a collet-type locking device for frictionally locking the flanged adapter in driven engagement on a smooth surfaced shaft after sliding the adapter to any desired axial position on the shaft and tightening the locking device by hand without the aid of tools. The locking device may be formed on the wing nut, or may be formed on either end of the flanged adapter.

20 Claims, 10 Drawing Figures

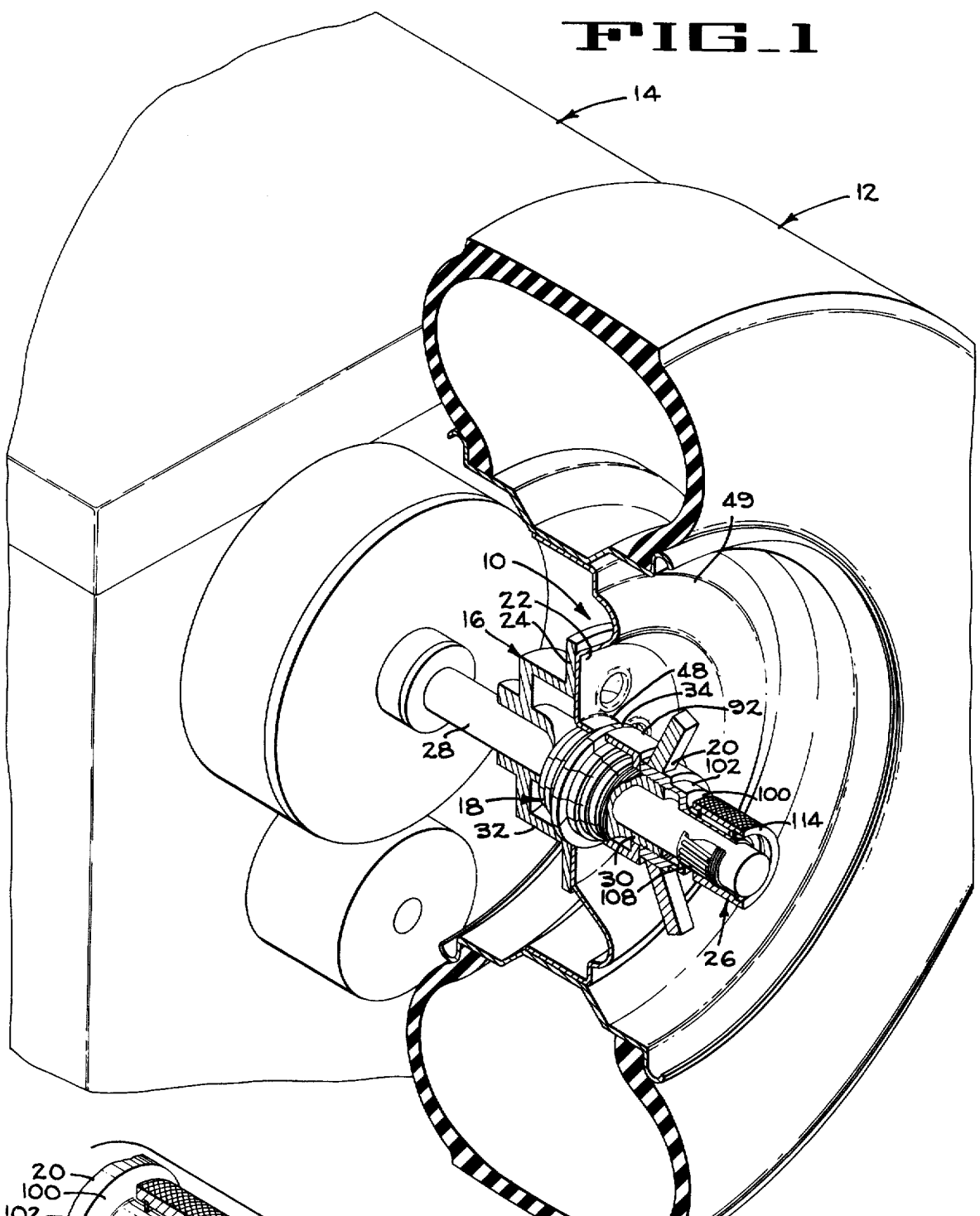
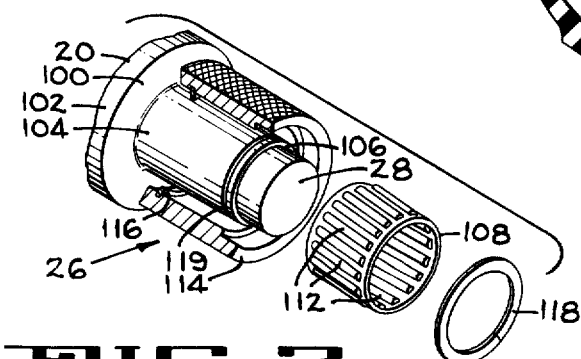
FIG.1
FIG.2

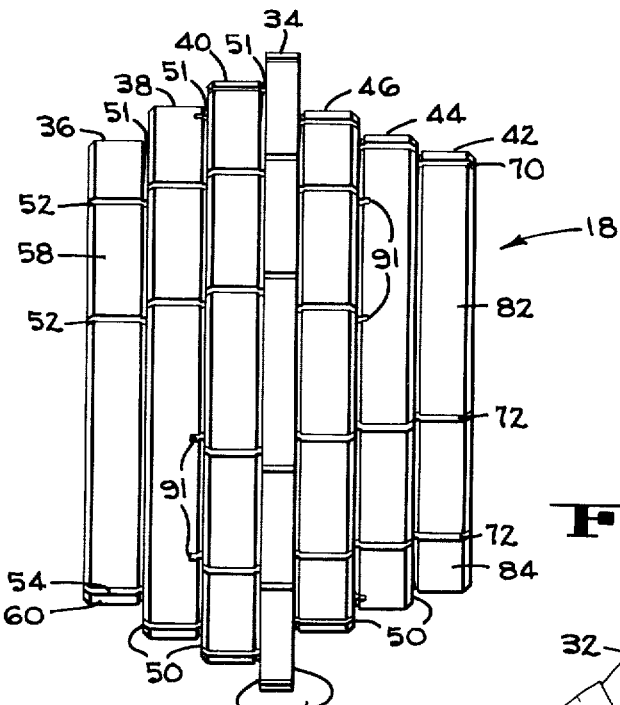
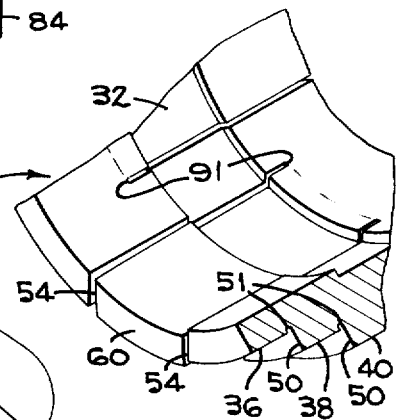
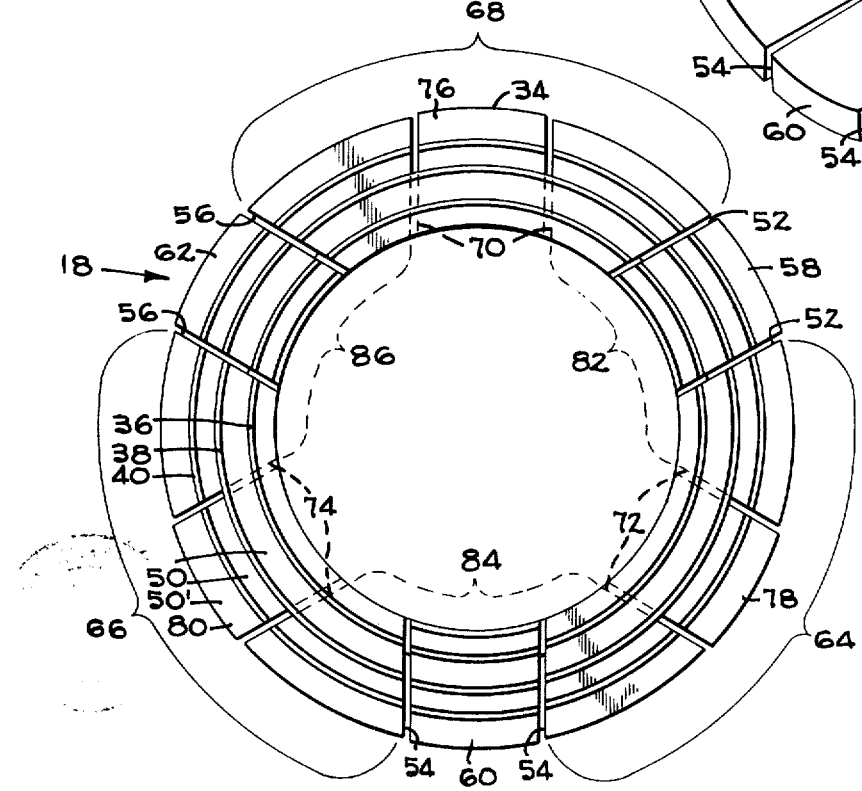

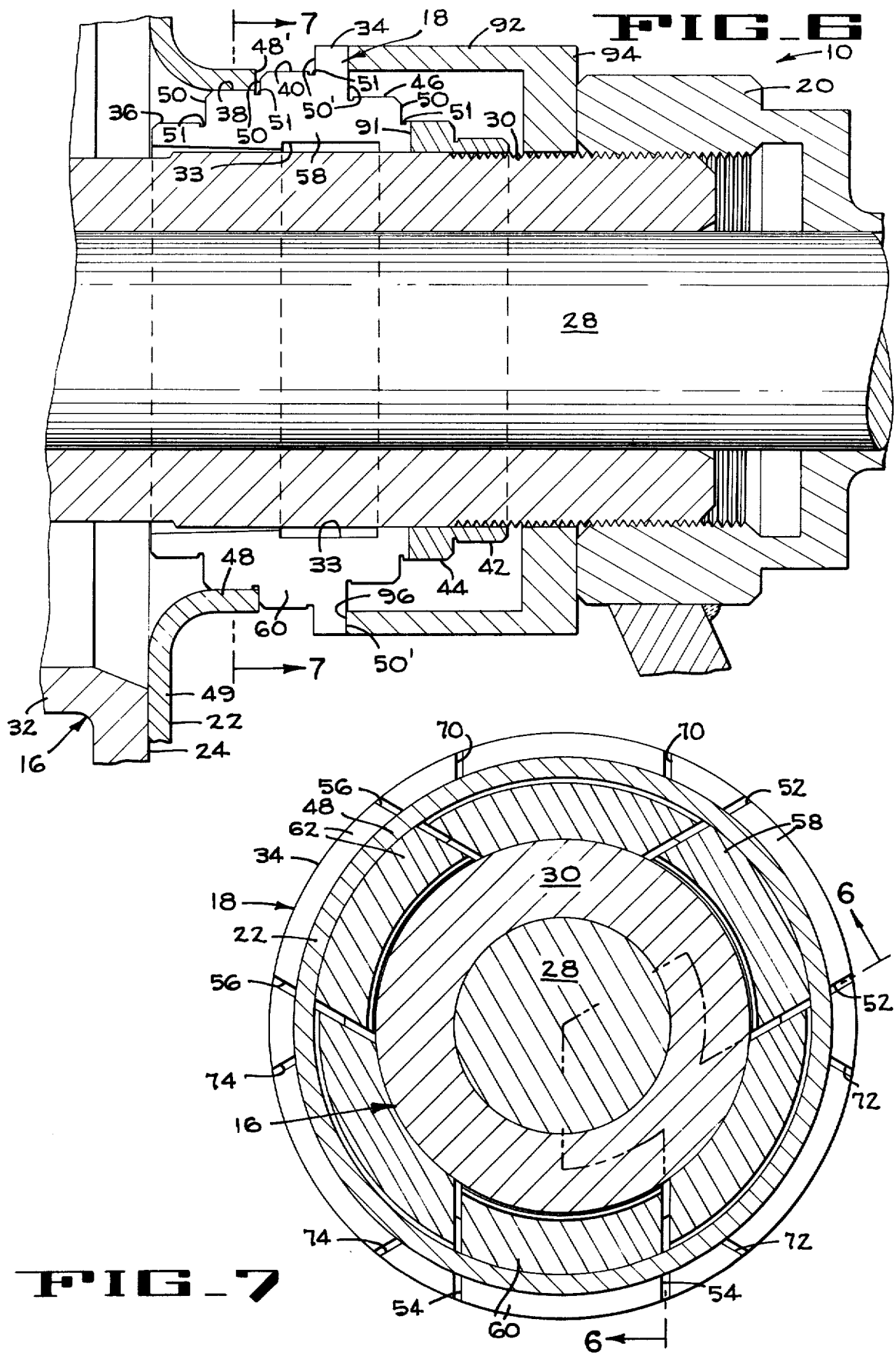

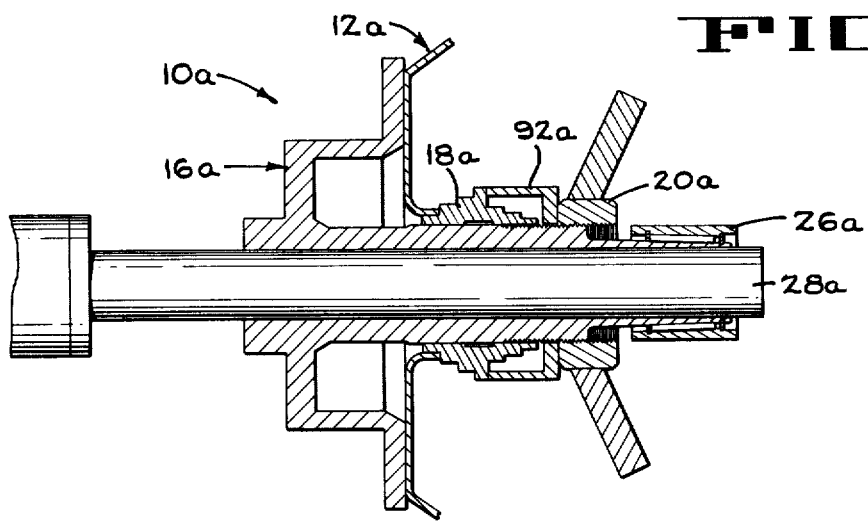
FIG_8
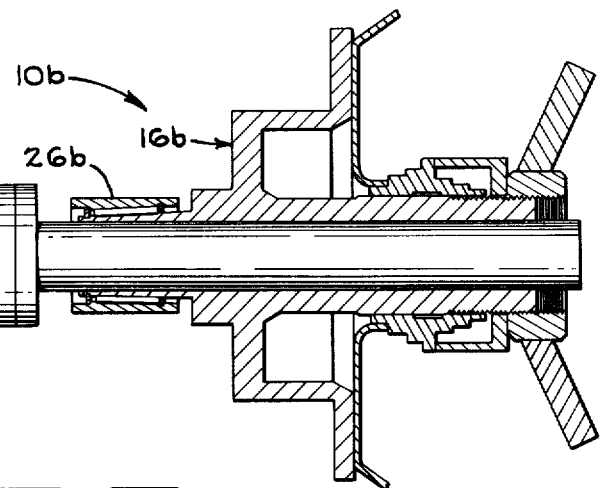
FIG_9
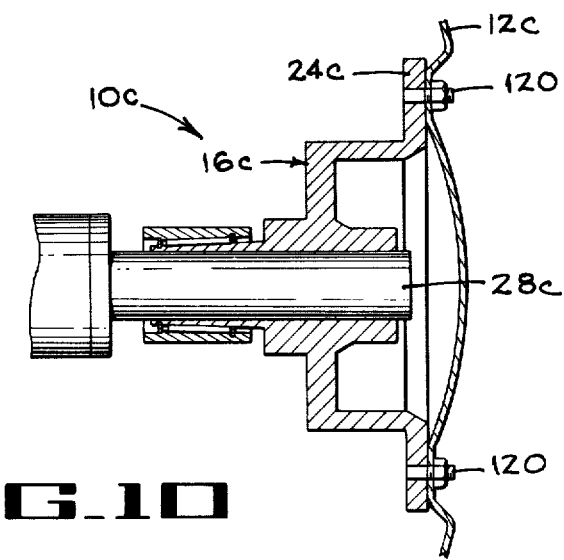
FIG_10

3,889,542

WHEEL MOUNTING APPARATUS

BACKGROUND OF THE INVENTION

1. Field of the Invention

This invention pertains to wheel mounting apparatus, and more particularly relates to an apparatus for attaching a wheel and tire assembly in driven engagement with a shaft at a desired axial position on the shaft, and for more accurately centering the wheel and tire assembly relative to the axis of the shaft.

2. Description of the Prior Art

It is well known that when balancing, truing, or correcting for radial force variation in a wheel and tire assembly, the assembly should be centered as accurately as possible about the axis of its supporting shaft or spindle.

The assignee of the present invention has manufactured a wheel centering adapter for several years (said adapter being illustrated in John Bean Division Brochure No. AU-322), which uses the conical face of a cone for centering the wheel and tire assembly by engaging the edge of the center hole of the wheels being handled. However, because wheel center holes vary in diameter from three to ten-thousandths of an inch from one car manufacturer to another, and because the outer edge of the drawneck of the center hole is not machined normal to the axis of the hole, the prior tapered cone centering device frequently did not center the wheel to the desired tolerances. When using the prior art tapered cone for centering the wheel, it has been determined that this method of centering has not been consistently accurate within 15 ounce inches due to the drawneck irregularities and the new procedure of boring the center hole to exact size and concentric, not to the drawneck, but to the outside of the wheel after the center hole has been formed to about 1/16th of an inch under the final bore dimension. Since the bore is very rarely concentric to the formed center hole or drawneck, the prior art cones do not produce true centering.

Another objectionable feature of the above mentioned prior art device was that after the wheel and tire assembly had been centered on the wheel centering adapter, the adapter was locked in driving engagement on the shaft of the balance by a driven pin on the spindle hub which engaged a hole in the adapter and was firmly clamped in place against the adapter hub by a nut screwed on the shaft. This manner of mounting the adapter on the spindle is objectionable both because the axial position of the wheel and tire assembly is fixed, unless spacer sleeves or the like are used to vary the distance of the adapter from the spindle flange. It is well known in the art that in certain types of wheel balancers, for example, two plane wheel balancers, the axial position of the wheel and tire assembly on the spindle is critical to effective balancing of the assembly.

In addition to the problem of limited axial adjustability of the prior art device on its shaft, it was also recognized that it was not undesirable and inconvenient to require hand tools to screw a nut on an expensive threaded shaft, but that the face of the nut was not always parallel to the contacted surface of the adapter resulting in undesirable bending of the shaft.

The patent to Lill No. 3,665,657, which patent is assigned to the assignee of the present invention, is pertinent in that it discloses adapters for centering disc brake rotors. The adapters are radially slotted about two-thirds of the adapter length from each end to provide equally spaced, radially movable elements which eliminate clearance between the shaft and the contacted portion of the disc brake rotor hub when two of the adapters are firmly clamped against the hub by a nut on a threaded shaft. The hub engaging portions of each adapter are arcuately curved to compensate for slight differences in internal diameter of the contacted portions of the disc brake rotors.

A collet-type shaft clamping device somewhat similar to the locking device disclosed herein is shown on page 1 of publication No. 9621-651 published by Gebr Hoffman Kg, Darmstadt, Germany and is included in their catalog as parts No. 332/1; 332/5 and 332/22.

SUMMARY OF THE INVENTION

The wheel mounting apparatus of the present invention solves the wheel centering problem by providing a wheel centering adapter with a double-faced, stepped cone wheel centering device slidable thereon and having equally spaced groups of outwardly bent resilient fingers for engaging the machined portion of the drawneck or center hole bored in the wheel thereby more effectively centering the wheel and tire assembly relative to the axis of the shaft of a wheel balancer or the like. The adapter also includes a protective collar and wing nut for clamping the wheel between the stepped cone centering device and an adapter flange.

When using the step cone centering device on the wheel balancer in accordance with the present invention, it has been determined that accuracies are consistently obtained to within 4 ounce-inches even on wheels having very irregular drawneck edges.

The problem of easily and reliably locking the adapter and attached wheel and tire assembly at any one of a plurality of axial positions on the shaft has been solved by forming in combination with the centering device and collet-type friction locking device either integrally with the wing nut, or integrally on either end of the adapter.

It is therefore one object of the present invention to provide a wheel centering apparatus for accurately centering a wheel and tire assembly about the axis of a shaft.

Another object is to provide an improved wheel centering apparatus which may be easily frictionally clamped to a shaft at any desired position axially of the shaft by hand and without the aid of tools.

Another object is to provide a double faced, stepped cone wheel centering device having on each face a plurality of equally spaced fingers bent outwardly for resiliently engaging the center hole of a wheel.

BRIEF DESCRIPTION OF THE DRAWINGS

FIG. 1 is a diagrammatic perspective of an off-the-car wheel balancer illustrating a wheel assembly centered on an adapter on the balancer drive shaft by the double faced, stepped cone wheel centering device and a collet-type friction locking device, which locking device is formed on the wing nut of the adapter.

FIG. 2 is an enlarged exploded perspective of the collet-type locking device, certain parts being shown in section.

FIG. 3 is an enlarged side elevation of the double faced wheel centering device.

FIG. 4 is an end view of the wheel centering device of FIG. 1 looking toward the right illustrating three equally spaced resilient fingers bent radially outward from tube clamping segments disposed therebetween.

FIG. 5 is a fragmentary perspective of a portion of the centering device illustrating one resilient finger bent outwardly from the adjacent portion of the device.

FIG. 6 is an enlarged section taken along lines 6—6 of FIG. 7 illustrating a wheel clamped to the adapter and further illustrating the manner in which two of the three equally spaced resilient fingers engage the machined inner cylindrical surface of the drawneck of a wheel and additionally illustrates the unmachined outer edge of the drawneck as being uneven.

FIG. 7 is a transverse section taken along line 7—7 of FIG. 6 illustrating three equally spaced resilient fingers of the step cone firmly engaging and centering the machined cylindrical surface of the center hole wheel, and the adjacent segments of the stepped cone engaging the shaft and spaced from the center hole.

FIG. 8 is a diagrammatic central section illustrating a second embodiment of the invention wherein the locking device is positioned on the right end of the tubular adapter.

FIG. 9 is a diagrammatic central section illustrating a third embodiment of the invention wherein the locking device is positioned on the left end of the tubular adapter.

FIG. 10 is a diagrammatic central section of a fourth embodiment of the invention adapted to handle wheels without any central hole in the wheel hub that is of sufficient size to accommodate the wheel balancer shaft.

DESCRIPTION OF THE PREFERRED EMBODIMENT

The wheel mounting apparatus 10 (FIG. 1) of the present invention is illustrated and will be described in connection with a wheel and tire assembly 12 being balanced by a wheel balancer 14. It will be understood, however, that the apparatus 10 can be used for clamping and centering wheel and tire assemblies on the shafts or spindles of other type of machines. For example, the wheel mounting apparatus can be used to center and clamp a wheel and tire assembly to the shaft of a tire truing machine or radial force grinder used to correct defects in a tire. It will also be understood that the apparatus can be used to center and clamp other rotatable members to shafts, and accordingly, it is intended that the term "wheel and tire assembly" as used in the claims shall be construed broadly enough to cover other rotatable elements.

In general, the wheel mounting apparatus 10 (FIG. 1) includes a tubular wheel centering adapter 16, a double faced, stepped cone wheel centering device 18, a wing nut 20 for clamping a wheel flange 22 between an adapter flange 24 and the step cone centering device 18, and a hand operated collet-type friction locking device 26 for frictionally locking the above described members to a shaft or spindle 28 of the wheel balancer 14.

More particularly and in accordance with the first embodiment of the wheel mounting apparatus 10 of the present invention as illustrated in FIGS. 1-7, the adapter 16 includes a threaded tubular body 30 (FIGS. 1 and 6) having its inner surface machined to provide a close sliding fit on the smooth surface of the shaft 28. The flange 24 is formed integrally with and is connected to the body 30 by an annular bracket 32 with the plane of the flange being perpendicular to the longitudinal axis of the tubular body 30.

An important feature of the invention is the provision of the double faced, stepped cone wheel centering device 18 which serves to center the wheel and tire assembly relative to the axis of the tubular adapter body 30 within very close tolerances. As mentioned previously, when using the step cone centering device on a wheel balancer in accordance with the present invention, it has been determined that accuracies are consistently obtained to within 4 ounce-inches even on wheels having very uneven drawneck edges.

The stepped cone centering device 18 (FIGS. 3-5) is internally bored to a dimension slightly larger than the outside diameter of the adapter body 30 for slidably engaging the body. A central portion of the centering device 18 is annularly relieved at 33 (FIG. 6) to reduce its thickness and add a certain amount of flexibility thereto. As best shown in FIGS. 3 and 6, the outer surface of the centering device 18 is formed as two stepped cones commencing at a large diameter central flange 34 and having stepped faces on either side of the central flange 34, with each face diminishing in diameter toward the associated outer end thereof. As illustrated in FIGS. 3 and 6, the left hand steps 36, 38, 40; and the right hand steps 42, 44 and 46 are all of different diameter and are each provided with cylindrical surfaces for engaging the machined drawneck 48 of the wheel 49 being centered. Each step is separated from the next adjacent step by substantially planar surfaces 50, 50' normal to the axis of the step cone centering device, and preferably by under cuts 51 to eliminate the possibility of any curved corners disrupting the centering accuracy of the device 18 by uneven engagement with the unmachined edge 48' of the drawneck 48 all as clearly illustrated in FIG. 6.

As best shown in FIGS. 6 and 7, three pair of slots which are preferably parallel slots 52, 52; 54, 54; and 56, 56 are cut approximately two-thirds of the way through the device 18 from the left end to define three equally spaced resilient left fingers 58, 60 and 62, respectively, which fingers are separated by three tube engaging segments 64, 66 and 68. It will be noted that each pair of slots do not project radially from the axis of the device 18 but preferably are parallel to an associated radial axis that bisects the associated fingers.

Similarly, three equally spaced pairs of parallel slots 70, 70; 72, 72; 74, 74 (FIGS. 3, 4 and 7) are cut approximately two-thirds of the way through the centering device 18 from the right end to define three equally spaced resilient right fingers 76, 78 and 80, respectively, separated by right tube engaging segments 82, 84 and 86 (FIG. 4).

Although in accordance with the preferred embodiment of the invention the slots are parallel slots, it will be understood that the fingers may be formed by slots that are not parallel. For example, the finger may be somewhat pie shaped converging toward their points of connection with the other portions of the centering device. Also, in order to prevent localization of forces at the connecting ends 91 (FIG. 5) of the slots, the slot ends may be drilled or cold worked to prevent splitting of the connecting portion 91 of the centering device 18.

After the parallel pairs of slots have been cut in the centering device, the fingers 58, 60, 62, 76, 78 and 80 are all bent equal amounts outwardly as illustrated by fingers 58 and 60 in FIGS. 6 and 7. These fingers are then machined so that the outer drawneck engaging surfaces of the fingers will, when unstressed, be bent outwardly a sufficient amount so that the selected steps will firmly engage the drawneck 48. It has been determined that outward deflection within the range of about 0.005 to 0.050 of an inch radially outward of the outer surfaces of the adjacent portion of the tube engaging segments of the same steps will provide the desired degree of resilient engagement with the drawneck when the centering device 18 is proportioned as illustrated in the drawings and has a length of about 2 and 1/16th inches with the outside diameter of the central flange 34 being about 2¾ inches. Preferably, the fingers of the smaller diameter steps will project radially outward from the adjacent surfaces of the tube engaging segment a greater distance than the larger steps in order to provide substantially the same amount of resilient gripping force at each step. After the fingers have been bent outwardly, both transverse side faces 50' of the central flange 34 are machined to define flat surfaces perpendicular to the axis of the centering device thus causing the surfaces of all aligned portions of the flange 34, whether on the fingers or on the tube engaging segments between the fingers to lie in either of two transverse planes when the fingers are unstressed.

In order to mount the wheel and tire assembly on the adapter 16 and centering device 18, both sides of the centering device are first presented to the drawneck 48 of the wheel 49 to determine which of the six steps of the centering device should be used. The step to be selected will be that step in which the drawneck contacting surfaces of the resilient fingers lie in a circle which is slightly larger in diameter than the machined internal diameter of the drawneck 48, so that the fingers will be resiliently stressed when moved into centering position within the drawneck. In FIGS. 6 and 7, the step 38 has been illustrated as being the proper step to radially deflect the resilient fingers 58, 60 and 62 upon insertion of the fingers within the drawneck 48. The selected step 38 is preferably moved into the drawneck 48 by hammering the centering device into the drawneck with a rubber hammer or the like.

The operator then inserts the tubular adapter body 30 through the drawneck 48 (FIG. 6) and centering device until the adapter flange 24 abuts the wheel flange 22. A protective collar 92 having an annular flange 94 is then slid over the adapter body 30 until the large diameter transverse edge 96 engages the adjacent planar side face 50' of the central flange 34. The wing nut 20 is then screwed on the threaded adapter body until it contacts the collar 92 and firmly clamps at least a portion of the unmachined edge 48' of the drawneck 48 against the transverse flange of the next largest step 40. One or two blows with a plastic mallet or rubber hammer on the wings of the wing nut 20 will be adequate to secure the wheel flange 22 in centered position between the adapter flange 24 and the centering device 18.

It will be noted that controlled tightening of the wing nut 20 not only axially clamps the wheel flange 22 between the centering device 18 and the flange 24, but also will cause inward deflection of the tube engaging segments 64, 66 and 68. In this regard, when tightening the wing nut 20, inward deflection of the three resilient fingers 58, 60 and 62 due to the fingers entering the machined cylindrical surface of the drawneck 48, will cause the attached portions of the central flange 34 to initially move their adjacent surfaces 50' a short distance away from the large diameter transverse edge 96 of the protective collar 92. Thus, the tightening force applied by the wing nut 20 through the collar 92 to the flange 34 will be applied primarily to the three segments of the central flange which are supported by the three adjacent tube engaging segments 64, 66 and 68 thereby causing these tube engaging segments to resiliently deflect radially inward into firm centered engagement with the outer periphery of the tubular adapter body 30. In this way, the centering device 18 is accurately centered on the adapter since all, or substantially all, clearance between the free ends of the tube engaging segments 64, 66 and 68 (FIG. 7) and the tubular adapter body 30 is eliminated during control tightening of the wing nut 20. Controlled tightening of the wing nut 20 also firmly clamps the wheel flange 22 between the adapter flange 24 and the transverse surface 50 or 50' of the next larger step, which transverse surface engages the unmachined edge 48' of the drawneck 48 as clearly illustrated in FIG. 6.

It will be understood that the wheel and tire assembly 12 is first frictionally locked on the centering device and may be assembled on the tubular adapter 16 as above described either prior to placing the adapter on the shaft 28 of the wheel balancer, or after the adapter 16 has been placed on the shaft 28.

In accordance with the first embodiment of the invention, the tubular adapter 16 with the wheel and tire assembly accurately center and rigidly clamped thereon as above described, is frictionally locked in desired axial position on and for rotation with the shaft 18 by the collet-type friction locking device 26 (FIGS. 1 and 2).

The friction locking device 26 is connected to or formed integrally with a flange 100 of a tubular extension 102 of the wing nut 20, which extension 102 is deep enough to telescope over the threaded tubular end portion of the adapter 16 to permit tightening of the wing nut 20.

The locking device 26 comprises an inner tube 104 of very hard steel secured to the flange 100 and internally ground to provide a close sliding fit on the balancer shaft 28. The outside diameter of the tube 104 is ground to a slight taper to provide a frusto-conical outer surface with the free or outer end 106 (FIG. 2) being smallest in diameter and having a wall thickness of about 1/25th that of the inside diameter of the tube. A frusto-conical thin metal roller guide cage 108 of the same taper as the outer surface of the tube 104 but of slightly larger diameter, surrounds the tube. The cage 108 is provided with a plurality of evenly spaced roller receiving slots formed therein at slight angles relative to the axis of the tube. A plurality of cylindrical needle rollers 112 are placed in the cage slots and are rollably received between the outer frusto-conical surface of the tube and an identically tapered but larger frusto-conical inner surface of a hard steel collar 114 having a knurled outer surface for effective hand gripping. The cage 108, rollers 112 and collar 114 are retained on the tube 104 by an internal snap ring 116 fitted in a groove on the large end of the collar 114, and an internal snap ring 118 fitted in a groove 119 in the small end of the tube 104.

When the collar 114 is rotated relative to the tube 104 in one direction by hand, the rollers 112 roll along a helical path toward the larger end of the tube 104 carrying the tube and collar 114 by frictional engagement therewith. This action creates a tremendous compressive force on the outside of the tube 104 causing the relatively thin walled tube to elastically distort resulting in the tube frictionally gripping the shaft 28 of the balancer 14 with great pressure thereby locking the wheel mounting apparatus 10 and the attached wheel and tire assembly 12 to the shaft 28 at the desired axial position on and for rotation with the shaft.

When the collar 114 is rotated in the opposite direction, the rollers 112 move along the helical path toward the small end of the tube 104 releasing the compressive force on the tube 104 allowing it to return to its unstressed position. It is apparent that the locking device 26 may be tightened or loosened by rotating the wheel and tire assembly 12 and holding the collar 114 from rotation; or alternately, the wheel and tire assembly may be held from rotation while the collar 114 is rotated by hand.

The wheel mounting apparatus 10a of the second embodiment of the invention illustrated in FIG. 8 is substantially the same as the first embodiment of the invention except for the location of the locking device 16a. Accordingly, only the differences between the first and second embodiment will be described, and parts of the second embodiment which are the same or similar to those of the first embodiment will be identified by the numerals given to the first embodiment followed by the letter a.

In the wheel mounting apparatus 10a, a wheel and tire assembly 12a is clamped to the wheel centering adapter 16a by a centering device 18a, protective collar 92a and wing nut 20a in the same manner as in the first embodiment. The locking device 26a, however, is not connected to the wing nut 20a but instead is connected to the right end of the wheel centering adapter 16a. Thus, the wheel mounting apparatus 10a is ideally adapted to handle groups of wheel and tire assemblies 12a that are substantially the same and which do not require axial movement of the adapter 16a on the shaft 28a when testing the several assemblies in each group. In this regard, the adapter 16a may remain locked to the shaft 28a while all of the wheel and tire assemblies 12a in the group are being tested. If operated in this manner, the several wheel and tire assemblies 12a will, of course, be mounted on and removed from the adapter 16a when the adapter is locked to the shaft 28a by inserting or removing the wheel centering device 18a, the protective collar 92a, and the wing nut 20a in the manner described in regard to the first embodiment of the invention.

The third embodiment of the wheel mounting device 10b is illustrated in FIG. 9 and operates in exactly the same manner as the second embodiment of the invention except that the locking device 26b is secured to the left end of the adapter 16b.

The fourth embodiment of the wheel mounting device 10c is illustrated in FIG. 10 and is designed to handle certain European type wheel and tire assemblies 12c wherein either the wheel does not have a central opening or the central opening is too small to accommodate the shaft 28c. This type of wheel and tire assembly 12c is centered and bolted directly to the flange 24c of a truncated cylindrical adapter 16c by the usual wheel lugs 120. The locking device 26c is formed on the left end of the adapter 16c and is tightened on the shaft 28c in the same manner described in the other embodiments of the invention.

From the foregoing description it will be apparent that the wheel mounting apparatus includes a double faced, stepped cone wheel centering device which includes three outwardly bent resilient fingers in each face separated by three tube engaging segments. The proper step is selected for resilient deflection and centering within a machined cylindrical surface of the wheel's drawneck, and a wing nut and cooperating tubular adapter are provided to axially move the centering device and the wheel into clamping engagement with a flange of a tubular adapter and at the same time urge the tube engaging segments inwardly for more effective centering against the tube. A hand operated friction locking device is added to the above combination to frictionally lock the wheel and supporting parts to the shaft of a wheel balancer or the like. The friction locking device may be formed on either end of the adapter, or may be formed on the wing nut.

Although the best mode contemplated for carrying out the present invention has been herein shown and described, it will be apparent that modification and variation may be made without departing from what is regarded to be the subject matter of the invention.

I claim:

1. A wheel mounting apparatus for centering a wheel and tire assembly having a center hole relative to the axis of a shaft and for rigidly clamping the assembly to the shaft including, an adapter slidably received on the shaft and including a tubular portion and a flange disposed normal to the axis of the tube, a centering device slidably received on the tube for engaging the center hole in the wheel, clamping means for firmly forcing the centering device into the center hole and for clamping the wheel against the flange, and shaft engaging means for locking the centered wheel and tire assembly on the shaft; the improvement which comprises means defining a plurality of steps on the outer surface of the centering device having cylindrical surfaces of different diameters, and means defining a plurality of axially elongated evenly spaced resilient fingers on said centering device separated by tube engaging segments, said resilient fingers being bent outwardly relative to the outer surfaces of said segments for engaging and being compressed by the inner surface of the center hole when in wheel centering position.

2. An apparatus according to claim 1 wherein said centering device is a double faced device which includes a large diameter transversely extending central flange with a plurality of steps of progressively smaller diameter formed on each side of said flange toward the outer ends thereof.

3. An apparatus according to claim 1 wherein said resilient fingers are formed by cutting pairs of slots through the tubular walls of the centering device, said slots entering axially from the small diameter end toward the other end of the centering device, and means at said other end interconnecting all of said resilient fingers.

4. An apparatus according to claim 3 wherein said slots which separate each finger from the adjacent segments are parallel slots.

5. An apparatus according to claim 2 wherein said resilient fingers are each formed by means defining a pair of slots through the tubular walls of the centering device, one group of slots extending axially from one small diameter end through said large diameter flange and terminating prior to reaching the other end, another group of slots extending axially from the other small diameter end through said large diameter flange and terminating prior to reaching the first mentioned end.

6. An apparatus according to claim 5 wherein each pair of slots which separates a finger from the adjacent segments are parallel slots.

7. An apparatus according to claim 1 wherein the shaft engaging locking means is a hand operated friction lock requiring no tools for tightening or loosening, and wherein the locking means is formed on said clamping means.

8. An apparatus according to claim 5 wherein the shaft engaging locking means is a hand operated friction lock requiring no tools for tightening or loosening, and wherein the locking means is formed on said clamping means.

9. An apparatus according to claim 1 wherein the shaft engaging means is a hand operated friction locking means requiring no tools for tightening or loosening, and wherein said locking means is formed on one end of said adapter.

10. An apparatus according to claim 5 wherein the shaft engaging means is a hand operated friction lock requiring no tools for tightening or loosening, and wherein said locking means is formed on one end of said adapter.

11. An apparatus according to claim 1 wherein the shaft engaging locking means is a hand operated friction lock requiring no tools for tightening or loosening, and wherein said locking means includes a thin walled tube having a frusto-conical outer surface, a collar having a frusto-conical inner surface surrounding the frusto-conical surface of said tube, and a plurality of cylindrical rollers disposed between the frusto-conical surfaces and angled relative to the axis of the tube for moving along a helical path toward the large end of the tube when relative movement in one direction is established between the tube and the collar for compressing the thin walled tube into clamping engagement with the shaft.

12. An apparatus according to claim 5 wherein the shaft engaging locking means is a hand operated friction lock requiring no tools for tightening or loosening, and wherein said locking means includes a thin walled tube having a frusto-conical outer surface, a collar having a frusto-conical inner surface surrounding the frusto-conical outer surface of said tube, and a plurality of cylindrical rollers disposed between the frusto-conical surfaces and angled relative to the axis of the tube for moving along a helical path toward the large end of the tube when relative movement in one direction is established between the tube and the collar for compressing the thin walled tube into clamping engagement with the shaft.

13. An apparatus according to claim 5 wherein each transverse face of said central flange is machined in a flat plane normal to the axis of the shaft when said resilient fingers are unstressed, and wherein said clamping means includes large diameter abutment means which engage a face of said flange, wherein portions of said flange are connected on said segments and other portions are connected on said fingers, wherein inward deflection of said resilient fingers when entering the center hole of the wheel cause the attached portion of said flange to move away from the large diameter abutment means causing the abutment means to exert its primary clamping force on the portion of the flange connected to the segments for urging the segments into tight centered engagement on said shaft.

14. A wheel mounting apparatus for centering a wheel and tire assembly having a center hole relative to the axis of a shaft including, a wheel engaging backup flange on the shaft and disposed normal to the axis of the shaft, a centering device supported concentrically on the shaft and movable axially thereof, clamping means for firmly forcing the centering device into the centering hole and for clamping the wheel against the flange, and shaft engaging means for locking the centered wheel and tire assembly on the shaft; the improvement which comprises means defining a plurality of cylindrical steps on the outer surface of the centering device with each step having a different diameter, means defining a plurality of axially elongated evenly spaced resilient fingers on said centering device separated by tube engaging segments, said resilient fingers being bent outwardly relative to the outer surfaces of said segments for engaging and being compressed by the inner surface of the center hole when moved into wheel centering position.

15. A wheel mounting apparatus for mounting a wheel and tire assembly in centered position and at a desired axial position on a shaft comprising a tubular adapter slidably received on the shaft and including a flange disposed normal to said shaft, means for securing a wheel and tire assembly on said adapter in centered position, a thin walled tube having a frusto-conical outer surface secured to one end of said adapter and slidably received on said shaft, a collar having a frusto-conical inner surface surrounding said sleeve, and a plurality of cylindrical rollers disposed between the frusto-conical surfaces and angled relative to the axis of the tube for moving along a helical path toward the large end of the tube when relative movement in one direction is established between the tube and the collar for compressing the thin walled tube into clamping engagement with the shaft.

16. An apparatus for mounting a wheel having a center opening in centered position on a shaft, a centering device comprising; a tubular body having a large diameter central flange and at least one small diameter end portion on one side of said flange, means defining a plurality of cylindrical steps of different diameter on the outer surface of the tubular body on said one side of said central flange, means defining a plurality of evenly spaced pairs of slots in said one tubular wall of the centering device to define equally spaced resilient fingers, and a plurality of shaft engaging segments disposed between said fingers, said slots extending axially from one end through said large diameter flange and terminating prior to reaching the other end, said fingers being bent upwardly from the adjacent segments to define resilient centering fingers for resiliently engaging the center opening in the wheel.

17. In an apparatus for mounting a wheel having a center opening in centered position on a shaft, a centering device comprising; a tubular body having a large diameter central flange and small diameter end portions on opposite sides of said flange, means defining a plurality of cylindrical steps of different diameters on the outer surface of the tubular body on each side of said central flange, means defining a plurality of evenly spaced pairs of slots in the walls on both sides of the flange to define equally spaced resilient fingers, and a plurality of shaft engaging segments disposed between said fingers, one group of slots extending axially from one end through said large diameter flange and terminating prior to reaching the other end, another group of slots extending axially from the other end through said large diameter flange and terminating prior to reaching the other end, said fingers being bent outwardly from the adjacent segments to define resilient centering fingers for resiliently engaging the center opening in the wheel.

18. A wheel mounting apparatus for mounting a wheel and tire assembly in centered position and at a desired axial position on a shaft comprising a tubular adapter slidably received on the shaft and including a flange disposed normal to said shaft, said adapter having an imperforate thin walled tubular portion normally slidable on said shaft, means for securing a wheel and tire assembly on said adapter in centered position, and a hand operated friction locking means encompassing said thin walled tubular portion of said adapter for compressing said thin walled portion into locking engagement on said shaft upon relative movement between said locking means and said adapter in one direction for locking said adapter from rotation and from axial movement relative to said shaft.

19. A wheel mounting apparatus according to claim 18 wherein said friction locking means frictionally locks said adapter on said shaft solely by compressing said thin walled tubular portion against the outer cylindrical surface of said shaft.

20. A wheel mounting apparatus according to claim 18 wherein said friction locking means includes a collar having an outer cylindrical surface which is gripped by hand and locks said adapter on said shaft by compressing said thin walled tubular portion adjacent said shaft when relative movement occurs between the collar and shaft in said one direction and which releases the adapter from gripping engagement with said shaft when relative movement occurs between the collar and the shaft in the opposite direction.

* * * * *